(No Model.)
J. L. RITER.
SEEDING MACHINE.
No. 295,945.
Patented Apr. 1, 1884.
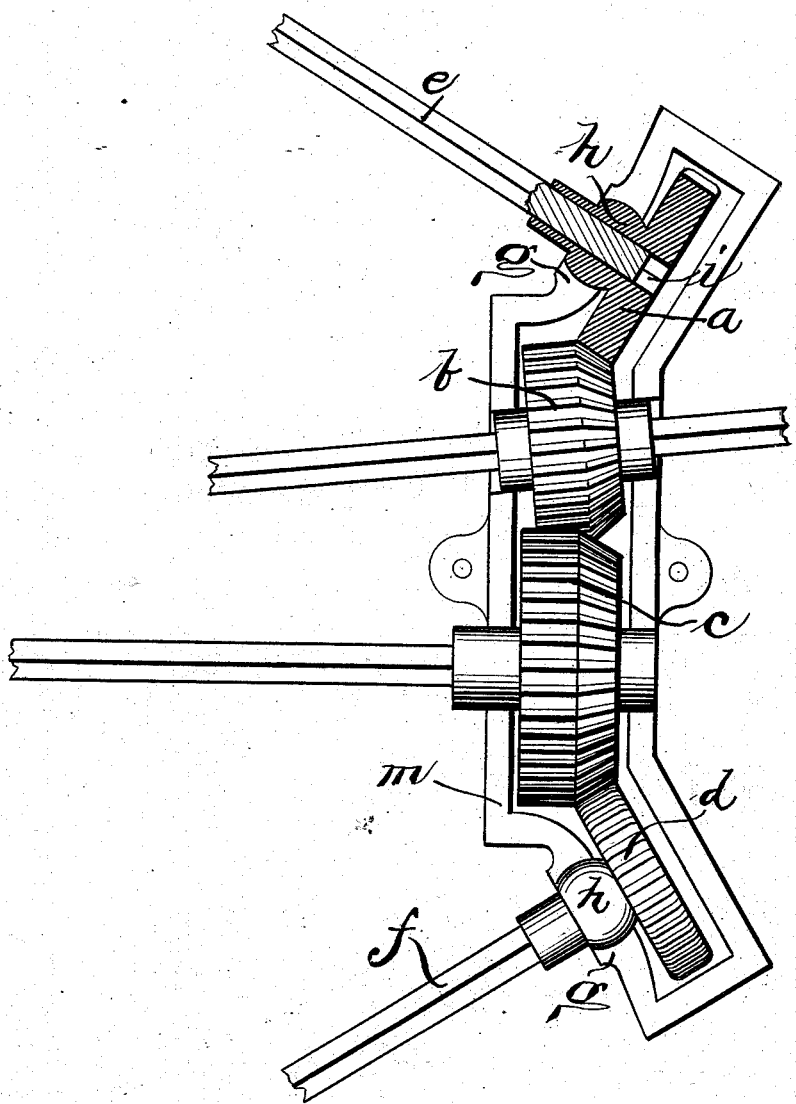

UNITED STATES PATENT OFFICE.

JOHN L. RITER, OF BROWNSVILLE, ASSIGNOR TO NORRIS & BROTHER, OF RUSHVILLE, INDIANA.

SEEDING-MACHINE.

SPECIFICATION forming part of Letters Patent No. 295,945, dated April 1, 1884.

Application filed January 30, 1883. (No model.)

*To all whom it may concern:*

Be it known that I, JOHN L. RITER, of Brownsville, Union county, Indiana, have invented certain new and useful Improvements in Seeding-Machines, of which the following is a specification, reference being had to the accompanying drawing, which is a plan of a device embodying my improvements.

This invention relates to that class of seeding-machines in which the seed-boxes and their feed devices are mounted on a central beam and on swinging radial arms hinged thereto, and in which motion is communicated to the several feed devices through a train of gears connected with the driving-wheel.

This invention relates to the construction of the journals and bearings of the outer gears of the train, or those gears which transmit motion to the feeding device mounted on the swinging radial arms.

The invention will be understood from the following description.

In the drawing, $a$, $b$, $c$, and $d$ represent the well-known train of central gears common to the class of machines to which this invention pertains; $e$ and $f$, the usual shafts through which the gears $a$ and $d$ communicate motion to the feeding device attached to the swinging radial arms; $m$, the metal case in which the train of gears is journaled; $i$, holes through the gears $a$ and $d$, fitted to shafts $e$ and $f$; $h$, ball-shape journals formed on hubs projecting from one of the faces of the gears $a$ and $d$; $g$, bearings in the case $m$, fitting the said journals. The journals $h$ are formed of spherical zones, as shown, whereby they are of less diameter at the ends than at the center. They furnish the journals of rotation for the gears. They permit the gears to oscillate as the swinging radial arms during their adjustment oscillate the shafts $e$ and $f$, and they prevent improper end movement of the gears. The shafts $e$ and $f$ are preferably square, and the receiving-holes pass entirely through the gears.

Heretofore these oscillating gears have been constructed with a step-bearing in the form of a spherical segment, as distinguished from a spherical zone. The gears were not well steadied by such bearings, the bearings required to be supplemented by spherical-face bearings arranged on the opposite faces of the gears, and the shaft-holes could not be cored all the way through the bearings, so as to permit the proper longitudinal adjustment of their shafts.

I claim as my invention—

In a seeding-machine of the class specified, the combination, with the other gears of the driving-train, of the outside gears, each having a journal in the form of a spherical zone, and a bearing fitting the same and adapted to permit oscillation of the gears, but to prevent improper displacement of the same.

JOHN L. RITER.

Witnesses:
GEORGE R. KELLY,
H. P. HOOD.